(12) United States Patent
Parpia et al.

(10) Patent No.: US 8,661,386 B1
(45) Date of Patent: Feb. 25, 2014

(54) METHOD AND APPARATUS FOR PERFORMING TIMING ANALYSIS WITH CURRENT SOURCE DRIVER MODELS USING INTERPOLATED DEVICE CHARACTERISTICS

(75) Inventors: Zahir Parpia, Toronto (CA); David Lewis, Toronto (CA)

(73) Assignee: Altera Corporation, San Jose, CA (US)

( * ) Notice: Subject to any disclaimer, the term of this patent is extended or adjusted under 35 U.S.C. 154(b) by 861 days.

(21) Appl. No.: 12/231,826

(22) Filed: Sep. 5, 2008

(51) Int. Cl.
*G06F 17/50* (2006.01)

(52) U.S. Cl.
USPC .......................................... 716/113; 716/108

(58) Field of Classification Search
USPC .................................. 716/108, 113
See application file for complete search history.

(56) References Cited

U.S. PATENT DOCUMENTS

| | | | |
|---|---|---|---|
| 7,359,843 B1* | 4/2008 | Keller et al. | 703/2 |
| 2003/0046045 A1* | 3/2003 | Pileggi et al. | 703/4 |
| 2005/0204318 A1* | 9/2005 | Iadanza et al. | 716/4 |
| 2005/0278671 A1* | 12/2005 | Verghese et al. | 716/6 |
| 2006/0095869 A1* | 5/2006 | Levy | 716/1 |
| 2011/0173580 A1* | 7/2011 | Levy | 716/102 |

* cited by examiner

*Primary Examiner* — Vuthe Siek
(74) *Attorney, Agent, or Firm* — L. Cho

(57) ABSTRACT

A method for performing static timing analysis includes generating current source driver models for components in a system operating at a supply voltage during a simulation of a path. A delay value for the path is derived from the simulation using the current source driver models for components along the path.

16 Claims, 8 Drawing Sheets

METHOD AND APPARATUS FOR PERFORMING TIMING ANALYSIS WITH CURRENT SOURCE DRIVER MODELS USING INTERPOLATED DEVICE CHARACTERISTICS

TECHNICAL FIELD

An embodiment of the present invention relates to electronic design automation tools for designing systems on target devices. More specifically, embodiments of the present invention relate to a method and apparatus for performing timing analysis with current source driver models using interpolated device characteristics.

BACKGROUND

Logic devices such as field programmable gate arrays (FPGAs) are used to implement large systems that may include million of gates and megabits of embedded memory. The complexity of large systems often requires the use of electronic design automation (EDA) tools to create and optimize a design for the system onto physical target devices. Among the procedures performed by EDA tools in a computer aided design (CAD) flow are synthesis, placement, and routing.

Timing analysis is an important aspect of design that allows the EDA tools to determine whether certain synthesis, placement, and/or routing decisions allow a design to satisfy system timing requirements. If a particular synthesis, placement, and/or routing decision does not satisfy system timing requirements, alternate strategies may be explored and/or notification may be provided to the system designer. Timing analysis may be performed during or after synthesis, placement, and routing.

In efforts to reduce power dissipation of systems, EDA tools attempt to identify the lowest supply voltages that systems can operate on target devices while still satisfying system timing requirements. Generally, the finer the level of granularity of testable supply voltages are available to static timing analyzers, the more optimal a solution can be found by the static timing analyzers. Most static timing analyzers, however, limit the supply voltages that are testable to discrete values. The current source driver model for performing static timing analysis requires models of circuit elements at all testable supply voltages. The size of memory storage limits the number of such models that can be made available.

SUMMARY

According to an embodiment of the present invention, a model operating at a supply voltage of interest is generated during timing analysis if an existing model operating at the supply voltage of interest is not available. Base voltages for which models operate at that do exist are identified. Current values for models operating at the supply voltage of interest are interpolated from the current values in the models operating at the base voltages. The model operating at the supply voltage of interest may be used by a static timing analyzer to generate a delay value. This allows a delay value to be generated for the supply voltage of interest by performing a single run of the timing analyzer. Interpolating current values from models operating at base voltages and executing a single run of the timing analyzer yields better accuracy and improved performance over executing a plurality of runs of the timing analyzer with models operating at base voltages and interpolating a plurality of delay values to generate a delay value at the supply voltage of interest.

BRIEF DESCRIPTION OF THE DRAWINGS

The features and advantages of the present invention are illustrated by way of example and are by no means intended to limit the scope of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, and programs are shown in block diagram form to avoid obscuring embodiments of the present invention unnecessarily.

Figure 1:
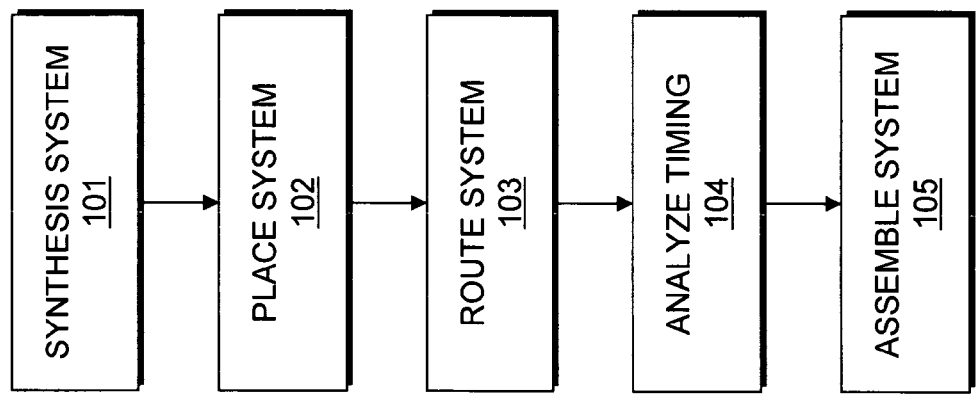
FIG. 1 is a flow chart illustrating a method for designing a system on a target device according to an embodiment of the present invention.

FIG. 1 is a flow chart illustrating a method for designing a system according to an embodiment of the present invention. The method may be performed by a system designer such as an EDA tool. The target device may be an ASIC, structured ASIC, FPGA, programmable logic device (PLD), printed circuit board (PCB), or other target device. At 101, synthesis is performed on a design of a system. According to an embodiment of the present invention, synthesis generates an optimized logical representation of the system from a HDL design definition. The optimized logical representation of the system may include a representation that has a minimized number of functional blocks such as logic gates, logic elements, and registers required for the system. Technology mapping is also performed on the optimized logic design. Technology mapping includes determining how to implement logic gates and logic elements in the optimized logic representation with resources available on the target device. The resources available on the target device may be referred to as "cells" or "components" and may include logic-array blocks, registers, memories, digital signal processing blocks, input output elements, and other components. According to an embodiment of the present invention, an optimized technology-mapped netlist (cell netlist) is generated from the HDL.

At 102, the mapped logical system design is placed. Placement works on the optimized technology-mapped netlist to produce a placement for each of the functional blocks. According to an embodiment of the present invention, placement includes fitting the system on the target device by determining which resources available on the target device are to be used for specific function blocks in the optimized technology-mapped netlist. According to an embodiment of the present invention, placement may include clustering which involves grouping logic elements together to form the logic clusters present on the target device.

At 103, it is determined which routing resources should be used to connect the components in the target device implementing the functional blocks of the system. During routing, routing resources on the target device are allocated to provide interconnections between logic gates, logic elements, and other components on the target device. The routing procedure may be performed by a router in an EDA tool that utilizes routing algorithms.

At 104, timing analysis is performed to determine one or more delay values for one or more paths in the system. A path may include a path for a signal through routing resources and/or through components. According to an embodiment of the present invention, a delay value is computed by performing a simulation using one or more current source driver models that model components as a voltage controlled non-linear current source with additional components such as internal capacitance. Each current source driver model includes output current values for one or more circuit elements operating at a supply voltage as a function of input voltages and output voltages of the one or more circuit element. If current source driver models for components are not available at a desired supply voltage, current source driver models for the components are generated by interpolating output current values for the one or more circuit elements from output current values from available current source driver models.

The one or more delay values may be output to a designer or user of the system. Alternatively, the timing analysis procedure 104 may be performed during or after synthesis procedure 101, placement procedure 102, and/or routing procedure 103 and the one or more delay values may be used to improve or optimize synthesis, placement, and/or routing decisions.

At 105, an assembly procedure is performed. The assembly procedure involves creating a data file that includes some of the information determined by the procedure described by 101-103. The data file may be a bit stream that may be used to program the target device. According to an embodiment of the present invention, the procedures illustrated in FIG. 1 may be performed by an EDA tool executed on a first computer system. The data file generated may be transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium.

Figure 2:
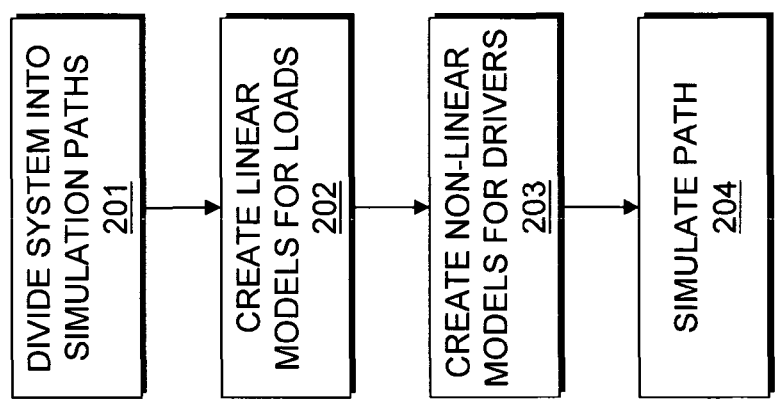
FIG. 2 is a flow chart illustrating a method for performing static timing analysis using a current source driver model according to an embodiment of the present invention.

FIG. 2 is a flow chart illustrating a method for performing static timing analysis using a current source driver model according to an embodiment of the present invention. The procedure illustrated in FIG. 2 may be performed at 104 at FIG. 1. At 201, the system is divided into a set of simulation paths. According to an embodiment of the present invention, the path from a source circuit element to a destination circuit element may be broken into sub-paths referred to as simulation paths to speed the simulation by exploiting spatial-temporal locality. Each simulation path may contain a single driver, routing wires, and loads.

At 202, linear models are created for each of the loads in the simulation paths. The linear models may, for example, include resistor/capacitor networks. According to an embodiment of the present invention, linear and non-linear loads are modeled using linear circuit models. The linear models represent the linear aspects of the non-linear loads. The linear models may ignore the non-linear characteristics of non-linear loads or approximate the non-linear characteristics of the non-linear loads.

At 203, non-linear models are created for each of the drivers in the simulation paths. Logic gates and multiplexers are examples of driver circuits. The driver models may be created from linear components, to represent the capacitance and resistances of the driver, and non-linear components.

At 204, a simulation path is simulated. A delay value may be generated from the simulation. The simulation path is simulated during times that a signal propagates through it. Simulation of a simulation path may involve utilizing the linear and non-linear models for loads and drivers on the simulation path. According to an embodiment of the present invention, the linear and non-linear models created at 202 and 203 are created with respect to loads and drivers operating at specified supply voltage. In the event that a linear or non-linear model is not available for a load or driver operating at a specified supply voltage, a model may be generated during simulation utilizing data from available linear and non-linear models.

It should be appreciated that some of the procedures illustrated in FIG. 2 with reference to performing static timing analysis using current source driver models may be supplemented and/or substituted with procedures described in U.S. Pat. No. 7,283,942 entitled "High Speed Techniques for Simulating Circuits" which is incorporated by reference.

Figure 3:
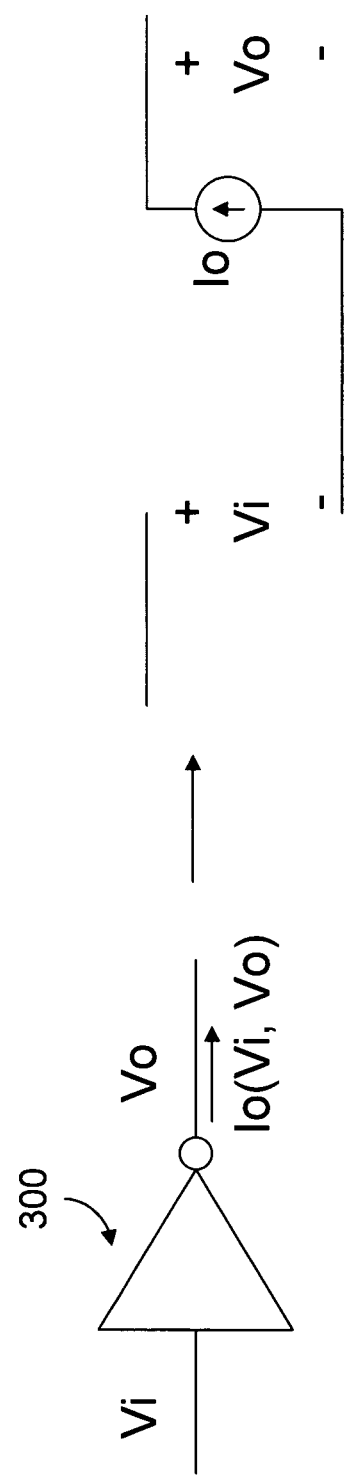
FIG. 3 is an exemplary current source driver model for an inverter according to an embodiment of the present invention.

FIG. 3 is an exemplary current source driver model for an inverter 300 according to an embodiment of the present invention. The idea of current source driver models is to model circuit elements as a voltage controlled non-linear current source with additional components such as internal capacitance. Output current is a function of input voltage and output voltage. In this example, for a particular supply voltage, the current source driver model for the inverter 300 includes an output current (Io) value generated by the inverter 300 that is a function of the input voltage (Vi) and output voltage (Vo). According to an embodiment of the present invention, the output current for each circuit element is pre-computed for different combinations of input voltage and output voltage over the range of the supply voltage. The set of lookup table data Io(Vi, Vo) for all different elements in a system or set of simulation paths are included in the model and stored in a storage unit for a given supply voltage.

Figure 4:
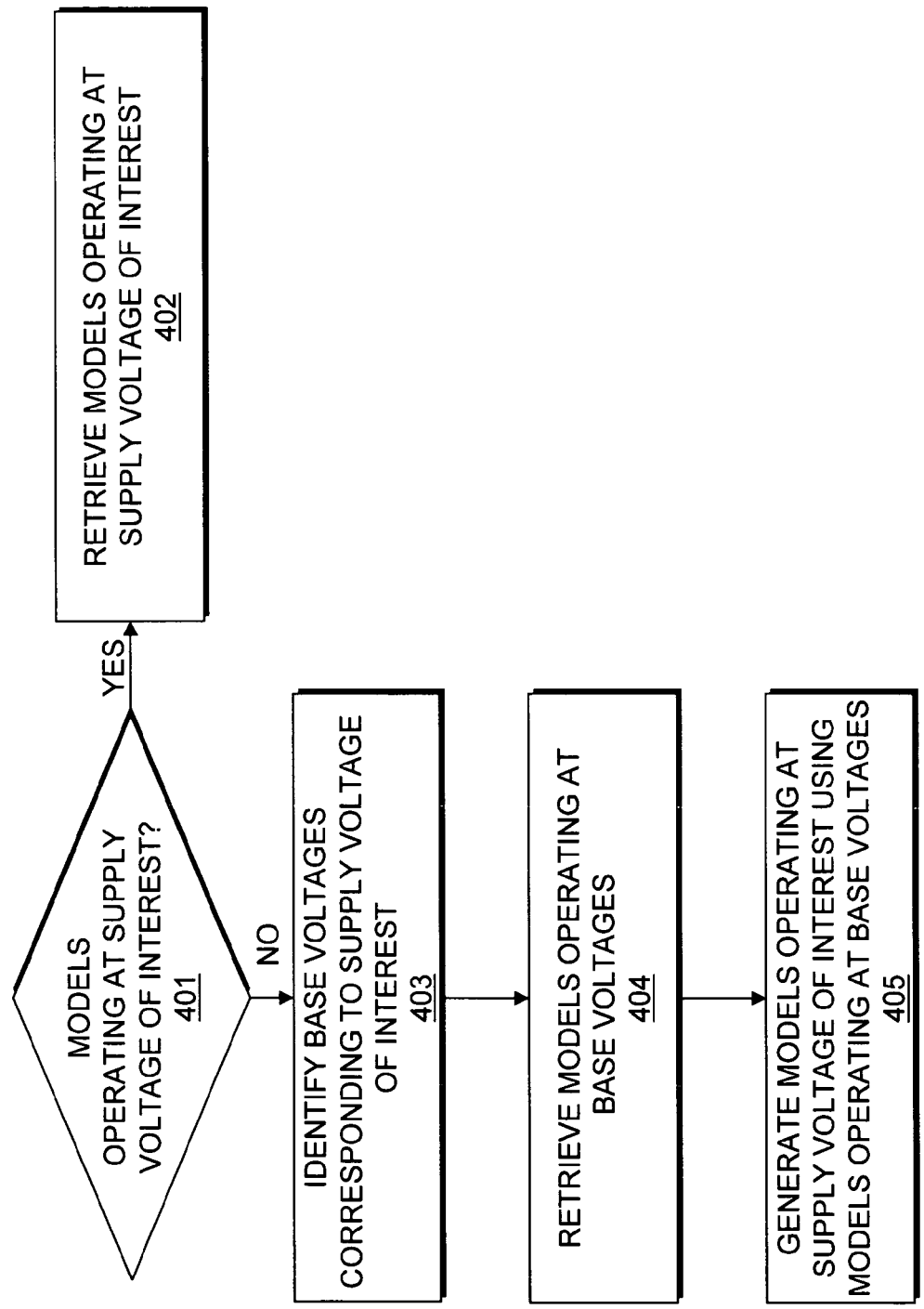
FIG. 4 is a flow chart illustrating a method for managing models according to an embodiment of the present invention.

FIG. 4 is a flow chart illustrating a method for managing models according to an embodiment of the present invention. The procedure illustrated in FIG. 4 may be performed at 104 illustrated in FIG. 1 or at 204 illustrated in FIG. 2. At 401, it is determined whether models exist for components operating a supply voltage of interest. The models may be, for example, current source driver models. The components may be circuit elements in a system or on a set of simulation paths. If it is determined that models exist for components operating at the supply voltage of interest, control proceeds to 402. If it is determined that models do not exist for components operating at the supply voltage of interest, control proceeds to 403.

At 402, the models for the components operating at the supply voltage of interest are retrieved. The models may be utilized for the simulation of a simulation path to determine a delay value.

At 403, base voltages of the supply voltage of interest are identified. According to an embodiment of the present invention, the base voltages are supply voltages for which models for components are available. The base voltages include a voltage that is higher and a voltage that is lower than the supply voltage and operate as end points. According to an embodiment of the present invention, base voltages with values that are closest to the supply voltage of interest are identified.

At 404, models for components operating at the base voltages are retrieved. According to an embodiment of the present invention where the models are current source driver models, values for input current, output voltage, and input voltage are retrieved.

At 405, models for components operating at the supply voltage of interest are generated using data from the models for components operating at the base voltages. According to an embodiment of the present invention where the models are current source driver models, output current values for a component operating at a desired supply voltage may be interpolated from output current values for a component operating at the base voltages.

It should be appreciated that the models generated at procedure 405 may be stored for use at a later time. In this embodiment, the output current values stored for the model generated at 405 may subsequently used to interpolate output current values for models of components operating at other supply voltages.

Figure 5:
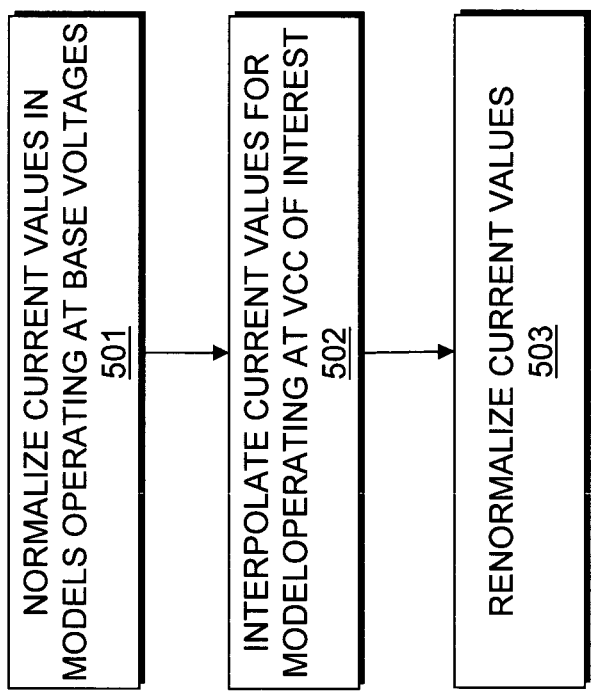
FIG. 5 is a flow chart illustrating a method for generating a model for voltage supply of interest according to an embodiment of the present invention.

FIG. 5 is a flow chart illustrating a method for generating a current source driver model for a circuit element operating at a voltage supply of interest according to an embodiment of the present invention. The procedure illustrated in FIG. 5 may be performed at 104 illustrated in FIG. 1, 204 illustrated in FIG. 2, or 405 in FIG. 4. At 501, output current values in models operating at the base voltages are normalized. According to an embodiment of the present invention, the output current values in the models are normalized by scaling the input voltage and output voltage values in each model by its corresponding supply voltage (Vcc). Thus, given $I_1(Vi, Vo)$ at $Vcc_1$ and $I_2(Vi, Vo)$ at $Vcc_2$, $I_{1norm}(Vi/Vcc_1, Vo/Vcc_1)$ and $I_{2norm}(Vi/Vcc_2, Vo/Vcc_2)$ are computed.

At 502, normalized output current values for the circuit element operating at the voltage supply of interest ($Io_{norm}$) are generated by interpolating the normalized output current values of the circuit element operating at the base voltages ($I_{1norm}$, $I_{2norm}$), where $Io_{norm}=f(I_{1norm}, I_{2norm})$.

At 503, the normalized output current values generated for the circuit element operating at the voltage supply of interest are re-normalized to the voltage supply of interest.

Figure 6:
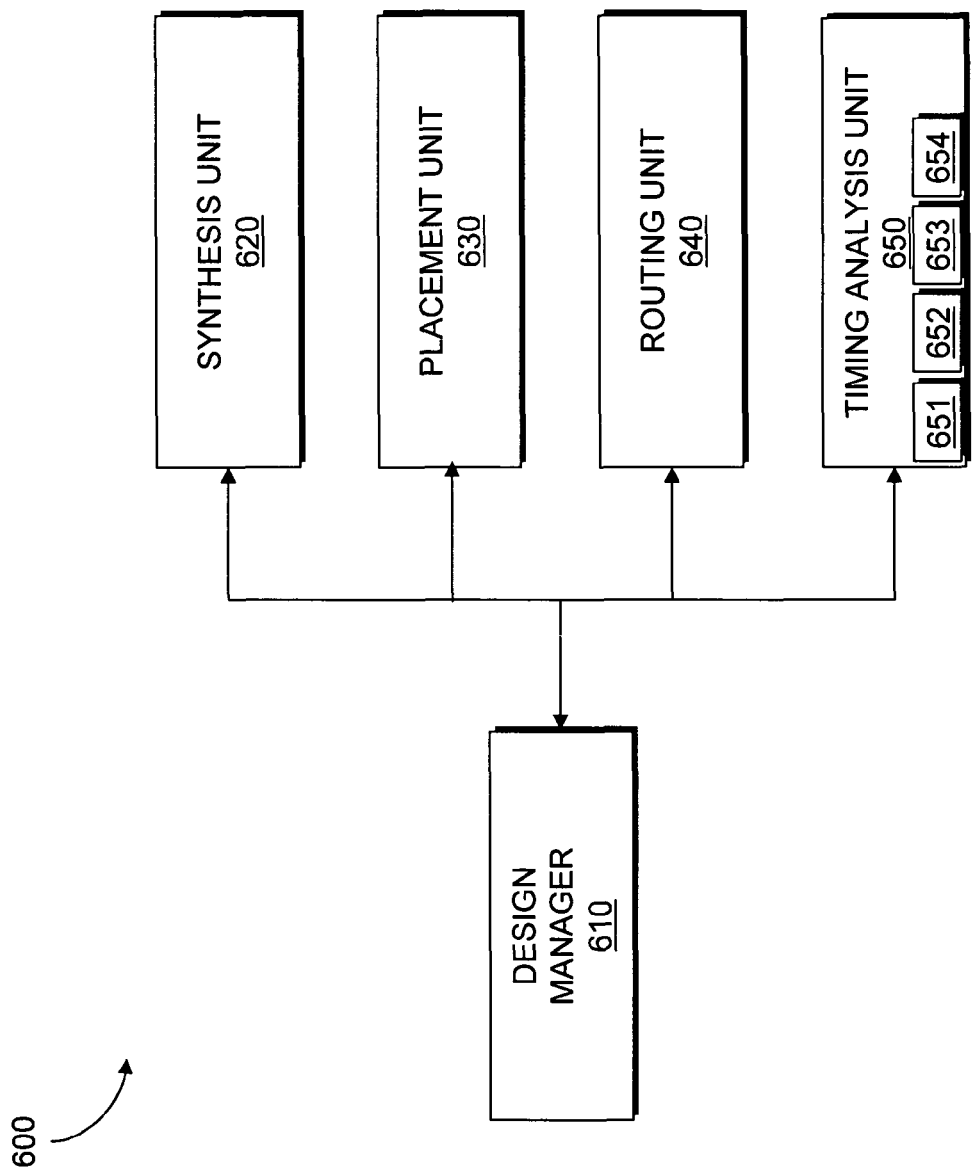
FIG. 6 illustrates a system designer according to an embodiment of the present invention.

FIG. 6 illustrates a system designer 600 according to an embodiment of the present invention. The system designer 600 may be an EDA tool for designing a system on a target device. The target device may be, for example, an ASIC, a structured ASIC, an FPGA, a PLD, or other circuitry. Furthermore the logic design may be implemented using semiconductor or nanoelectronic technology. FIG. 6 illustrates software modules implementing an embodiment of the present invention. According to one embodiment, system design may be performed by a computer system executing sequences of instructions represented by the software modules shown in FIG. 6. Execution of the sequences of instructions causes the computer system to support system design as will be described hereafter. In alternate embodiments, hard-wire circuitry may be used in place of or in combination with software instructions to implement the present invention. Thus, the present invention is not limited to any specific combination of hardware circuitry and software. The system designer 600 includes a designer manager 610. The designer manager 610 receives a design for a system. The design may be described at a gate level or in a more abstract level. The design may be described in terms of an HDL such as VHDL or Verilog. The target device may be an ASIC, structured ASIC, FPGA, PLD, or other target device. The designer manager 610 is connected to and transmits data between the components of the system designer 600.

Block 620 represents a synthesis unit that performs synthesis. The synthesis unit 620 generates a logic design of a system to be implemented in the target device. According to an embodiment of the system designer 600, the synthesis unit 620 takes a conceptual HDL design definition and generates an optimized logical representation of the system. The optimized logical representation of the system generated by the synthesis unit 620 may include a representation that has a minimized number of functional blocks and registers, such as logic gates and logic elements, required for the system. Alternatively, the optimized logical representation of the system generated by the synthesis unit 620 may include a representation that has a reduced depth of logic and that generates a lower signal propagation delay. The synthesis unit 620 also performs technology mapping. Technology mapping involves determining how to implement the functional blocks and registers in the optimized logic representation utilizing specific resources on a target device thus creating an optimized "technology-mapped" netlist. The technology-mapped netlist illustrates how the resources (components) on the target device are utilized to implement the system.

Block 630 represents a placement unit that performs placement. The placement unit 630 places the system on to the target device by determining which components or areas on the target device are to be used for specific functional blocks and registers. According to an embodiment of the system designer 600, the placement unit 630 first determines how to implement portions of the optimized logic design in clusters. Clusters may represent a subset of the components on the logic design. A cluster may be represented, for example, by a number of standard cells grouped together. In this embodiment, after portions of the optimized logic design are implemented in clusters, the clusters may be placed by assigning the clusters to specific positions on the target device. The placement unit 630 may utilize a cost function in order to determine a good assignment of resources on the target device.

Block 640 represents a routing unit that performs routing. The routing unit 640 determines the routing resources on the target device to use to provide interconnection between the components implementing functional blocks and registers of the logic design.

Block 650 represents a timing analysis unit that performs static timing analysis. The timing analysis unit 650 may perform timing analysis to determine one or more delay values for one or more paths in the system. A path may include a path for a signal through routing resources and/or through components. A delay value is computed by a simulation unit 651 that performs a simulation using one or more models for the components (circuit elements). According to an embodiment of the present invention, the models for the components may be current source driver models that model components as a voltage controlled non-linear current source with additional components such as internal capacitance. Each current source driver model includes output current values for one or more circuit elements operating at a supply voltage as a function of input voltages and output voltages of the one or more circuit element.

The timing analysis unit 650 includes a storage unit 652. The storage unit stores pre-computed current source driver models for components in the system operating at various supply voltages. The timing analysis unit 650 includes a base voltage identifier unit 653. The base voltage identifier unit identifies other supply voltages for which pre-computed current source driver models are available. The base voltages identified operate as end points of supply voltages for which pre-computed source driver models are not available. The timing analysis unit 650 includes an interpolation unit 654. If current source driver models for components are not available at a desired supply voltage, current source driver models for the components may be generated by the interpolation unit 654 by interpolating output current values for the one or more circuit elements from output current values from available current source driver models. It should be appreciated that the timing analysis unit 650 may perform the procedures described with reference to FIGS. 1, 2, and 4-5.

The one or more delay values generated by the timing analysis unit 650 may be output to a designer or user of the system. Alternatively, timing analysis may be performed during or after synthesis, placement, and/or routing and the one or more delay values may be used to improve or optimize synthesis, placement, and/or routing decisions made by the synthesis unit 620, placement unit 630, and routing unit 640 respectively.

According to an embodiment of the system designer 600, the design manager 610 performs an assembly procedure that creates a data file that includes the design of the system generated by the system designer 600. The data file may be a bit stream that may be used to program the target device. The design manager 610 may output the data file so that the data file may be stored or alternatively transmitted to a separate machine used to program the target device. It should be appreciated that the design manager 610 may also output the design of the system in other forms such as on a display device or other medium.

Semiconductor chips operate over a wide range of supply voltages. In order to minimize power dissipation in the chips, designers often desire the chips to operate at the minimum supply voltages that meet the system's timing requirements. In order to achieve this, timing analysis units should be capable to provide accurate delay values for simulations where the system or components in the system operate at all possible supply voltages. Embodiments of the present invention allow a timing analysis unit to provide delay values for a system or components in the system operating at any supply voltage within a valid range, with minimal impact on run-time, storage requirements, and accuracy.

In current source driver models, the output current (Io) is pre-computed for each circuit element for different combinations of input voltage and output voltage over a range of set supply voltages. Storage requirements, however, limit the set of supply voltages such that not all supply voltages have available models. Embodiments of the present invention, generate the output current values for any given supply voltage (Vcc) of interest not pre-computed by interpolating the output currents from previously derived set of base voltages. Once the output current values are generated, a simulation can be run to compute the delay values for the given supply voltage in a single run. This approach provides a more accurate simulation than one that interpolates delays. This approach also requires less simulation time over interpolating delays which requires at least two separate timing analysis runs.

Figure 7:
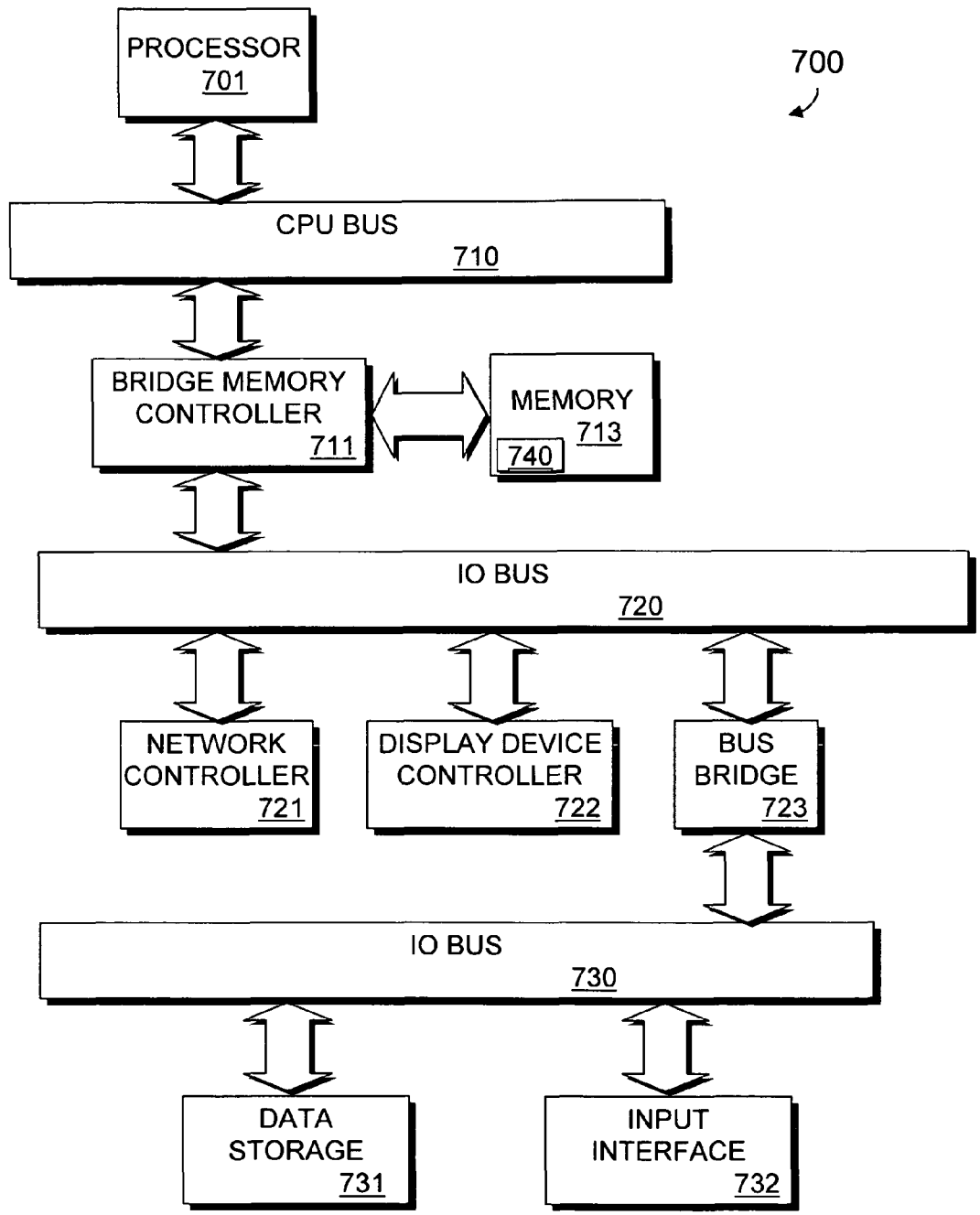
FIG. 7 illustrates a computer system that is used to implement the system designer according to an embodiment of the present invention.

FIG. 7 is a block diagram of an exemplary computer system 700 in which an example embodiment of the present invention resides. The computer system 700 may be used to implement the system designer 900 shown in FIG. 9. The computer system 700 includes a processor 701 that processes data signals. The processor 701 is coupled to a CPU bus 710 that transmits data signals between processor 701 and other components in the computer system 700.

The computer system 700 includes a memory 713. The memory 713 may store instructions and code represented by data signals that may be executed by the processor 701.

A bridge memory controller 711 is coupled to the CPU bus 710 and the memory 713. The bridge memory controller 711 directs data signals between the processor 701, the memory 713, and other components in the computer system 700 and bridges the data signals between the CPU bus 710, the memory 713, and a first IO bus 720.

The first IO bus 720 may be a single bus or a combination of multiple buses. The first IO bus 720 provides communication links between components in the computer system 700. A network controller 721 is coupled to the first IO bus 720. The network controller 721 may link the computer system 700 to a network of computers (not shown) and supports communication among the machines. A display device controller 722 is coupled to the first IO bus 720. The display device controller 722 allows coupling of a display device (not shown) to the computer system 700 and acts as an interface between the display device and the computer system 700.

A second IO bus 730 may be a single bus or a combination of multiple buses. The second IO bus 730 provides communication links between components in the computer system 700. A data storage device 731 is coupled to the second IO bus 730. The data storage device 731 may be a hard disk drive, a floppy disk drive, a CD-ROM device, a flash memory device or other mass storage device. An input interface 732 is coupled to the second IO bus 730. The input interface 732 may be, for example, a keyboard and/or mouse controller or other input interface. The input interface 732 may be a dedicated device or can reside in another device such as a bus controller or other controller. The input interface 732 allows coupling of an input device to the computer system 700 and transmits data signals from an input device to the computer system 700. A bus bridge 723 couples the first IO bus 720 to the second IO bus 730. The bus bridge 723 operates to buffer and bridge data signals between the first IO bus 720 and the second IO bus 730. It should be appreciated that computer systems having a different architecture may also be used to implement the computer system 700.

A system designer 740, such as the system designer 600 illustrated in FIG. 6, may reside in memory 713 and be executed by processor 701. The system designer 740 may operate to synthesize a system, place the system on a target device, route the system, and perform timing analysis on a design for the system.

Figure 8:
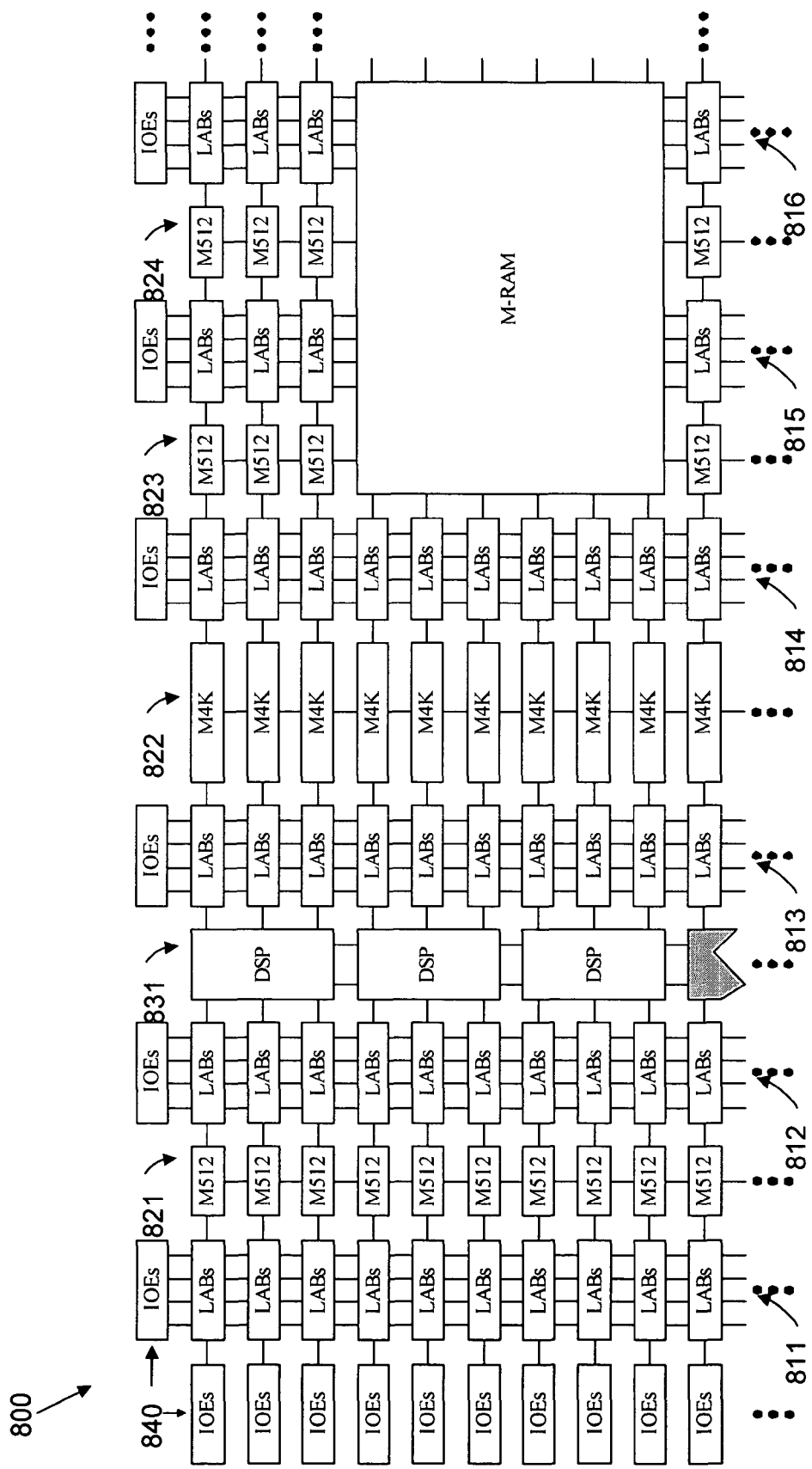
FIG. 8 illustrates a field programmable gate array (FPGA) according to an embodiment of the present invention.

FIG. 8 illustrates an exemplary target device 800 in which a system may be implemented on 800 utilizing an FPGA according to an embodiment of the present invention. According to one embodiment, the target device 800 is a chip having a hierarchical structure that may take advantage of wiring locality properties of circuits formed therein.

The target device 800 includes a plurality of logic-array blocks (LABs). Each LAB may be formed from a plurality of logic blocks, carry chains, LAB control signals, (lookup table) LUT chain, and register chain connection lines. A logic block is a small unit of logic providing efficient implementation of user logic functions. A logic block includes one or more combinational cells, where each combinational cell has a single output, and registers. LABs are grouped into rows and columns across the target device 800. Columns of LABs are shown as 811-816. It should be appreciated that the logic block may include additional or alternate components.

The target device 800 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the target device 800. Columns of memory blocks are shown as 821-824.

The target device 800 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the target device 800 and are shown as 831.

The target device 800 includes a plurality of input/output elements (IOEs) 840. Each IOE feeds an I/O pin (not shown) on the target device 800. The IOEs are located at the end of LAB rows and columns around the periphery of the target device 800.

The target device 800 includes LAB local interconnect lines (not shown) that transfer signals between LEs in the same LAB, a plurality of row interconnect lines ("H-type wires") (not shown) that span fixed distances, and a plurality of column interconnect lines ("V-type wires") (not shown) that operate similarly to route signals between components in the target device.

FIG. 8 illustrates an exemplary embodiment of a target device. It should be appreciated that a system may include a plurality of target devices, such as that illustrated in FIG. 8, cascaded together. It should also be appreciated that the target device may include programmable logic devices arranged in a manner different than that on the target device 800. A target device may also include FPGA resources other than those described in reference to the target device 800. Thus, while the invention described herein may be utilized on the architecture described in FIG. 8, it should be appreciated that it may also be utilized on different architectures, such as those employed by Altera® Corporation in its APEX™, Stratix™, Cyclone™, Stratix™ II, and Cyclone™ II families of chips and those employed by Xilinx® Inc. in its Virtex™ and Virtex™ II, and Virtex IV™ line of chips.

FIGS. 1, 2, and 4-5 are flow charts illustrating methods according to embodiments of the present invention. The techniques illustrated in these figures may be performed sequentially, in parallel or in an order other than that which is described. The techniques may be also be performed one or more times. It should be appreciated that not all of the techniques described are required to be performed, that additional techniques may be added, and that some of the illustrated techniques may be substituted with other techniques.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, or encoding a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

In the foregoing specification embodiments of the invention has been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method for performing static timing analysis, the method comprising:
generating current source driver models for components on a path, during a simulation of the path, by normalizing output current values for the components as a function of an input normalized voltage and an output normalized voltage, interpolating output current values for the current source driver models at supply voltages of interest from the normalized output current values, and re-normalizing the interpolated output current values; and
deriving a delay value for the path from the simulation using the current source driver models for the components, wherein at least one of the generating and deriving is performed by a processor.

2. The method of claim 1, wherein each of the current source driver models includes output current values for one or more circuit elements as a function of input voltages and output voltages of the one or more circuit elements.

3. The method of claim 1, wherein generating the current source driver models comprises identifying base voltages of the supply voltage.

4. The method of claim 3, further comprising pre-computing the current source driver models for the components in the system operating at the base voltages before performing simulation of the path.

5. The method of claim 4, further comprising storing the current source driver models for the components in a database.

6. The method of claim 1, further comprising storing the current source driver models for the components operating at the supply voltages in a storage unit.

7. The method of claim 6, further comprising using the current source driver models for the components operating at the supply voltages to generate current source driver models for components operating at another supply voltage.

8. The method of claim 1, further comprising determining whether to use a routing resource on a target device based on the delay value derived.

9. The method of claim 1, further comprising outputting the delay value to a designer of the system.

10. A non-transitory machine-readable medium including sequences of instructions stored thereon which, when executed by a computer, causes the computer to perform a method comprising:

generating current source driver models for components on a path operating at a desired supply voltage during a request to simulate the path in response to determining that current source driver models for the components have not been pre-computed, by normalizing output current values for the components as a function of an input normalized voltage and an output normalized voltage, interpolating output current values for the current source driver models at supply voltages of interest from the normalized output current values, and re-normalizing the interpolated output current value; and deriving a delay value for the path from the simulation using the current source driver models generated.

11. The non-transitory machine-readable medium of claim 10, wherein said method further comprises:
synthesizing a system on a target device;
mapping the system on the target device;
routing the system on the target device; and
modifying a decision made during one of the synthesizing, mapping, and routing procedures in response to the delay value.

12. The non-transitory machine-readable medium of claim 10, wherein each of the current source driver models includes output current values for one or more circuit elements as a function of input voltages and output voltages of the one or more circuit elements.

13. The non-transitory machine-readable medium of claim 10, wherein generating the current source driver models comprises identifying base voltages from the plurality of supply voltages.

14. A system designer, comprising:

a synthesis unit to synthesize a system;

a placement unit to place the system on a target device;

a routing unit to route the system on the target device; and a timing analyzer unit to generate current source driver models for components on a path during a simulation of the path, and to derive a delay value for the path from the simulation using the current source driver models generated, wherein the timing analyzer comprises an interpolation unit to interpolate an output current value for a current source driver model of a component operating at a desired supply voltage from output current values in current source driver models for the component operating at base voltages, wherein the output current values are normalized as a function of an input normalized voltage and an output normalized voltages prior to interpolation.

15. The system designer of claim 14, wherein the timing analyzer further comprises a storage unit of pre-computed current source driver models for components in the system operating at other supply voltages.

16. The system designer of claim 14, wherein the timing analyzer further comprises a base voltage identifier to identify other supply voltages stored in the database that operate as endpoints of the desired supply voltage.

* * * * *